United States Patent Office 3,845,169
Patented Oct. 29, 1974

3,845,169
α,ω-BIS-(O,O'-DIORGANOPHOSPHONYLMETHYL-
O-ORGANOPHOSPHINYL)-ALKANES
Ludwig Maier, Zurich, Switzerland, assignor to Monsanto Company, St. Louis, Mo.
No Drawing. Continuation of abandoned application Ser. No. 855,069, Aug. 15, 1969. This application Oct. 16, 1972, Ser. No. 298,063
Int. Cl. C07f 9/32
U.S. Cl. 260—932        2 Claims

ABSTRACT OF THE DISCLOSURE

α,ω - Bis - (O,O'-diorganophosphonylmethyl-O-organophosphinyl)-alkanes of the general formula

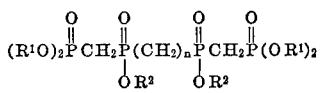

wherein $R^1$ and $R^2$ are hydrogen, identical or different organic groups, or taken together on the same phosphorus atom are a heterocyclic group and $n$ is an integer of at least 4, and a process therefor in which the corresponding alkylene-bis-phosphonous acid diester and a corresponding chloromethylphosphonic acid diester are heated to split off alkyl chloride.

---

This is a continuation of application Ser. No. 855,069, filed Aug. 15, 1969, now abandoned.

The present invention relates to a process for preparing α,ω - bis-(O,O'-diorganophosphonylmethyl-O-organophosphinyl)-alkanes of the general formula

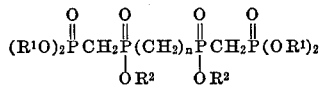

in which $R^1$ and $R^2$ signify hydrogen or identical or different organic groups as they can occur attached to phosphorus, or taken together on the same phosphorus atom signify a heterocyclic group and $n$ stands for an integer of at least 4.

The process is characterized in that a corresponding alkylene-bis-(phosphonous acid diester) of the general formula $$R^2O(R^3O)P(CH_2)_nP(OR^2)OR^3$$

in which $R^2$ and $n$ have the same significance as above and $R^3$ signifies an alkyl group or cycloalkyl group having up to 6 carbon atoms, and a corresponding chloromethylphosphonic acid diester of the general formula

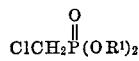

in which $R^1$ has the same significance as above, are heated with the exclusion of moisture and oxygen to at least 150° C., using a molar ratio of 1:2, until the cleavage of $R^3Cl$ is practically complete.

The reaction of the invention proceeds according to the equation:

$$R^2O(R^3O)P(CH_2)_nP(OR^2)OR^3 + 2ClCH_2P(O)(OR^1)_2 \longrightarrow$$

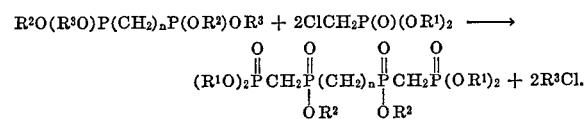

Among the alkylene-bis-(phosphonous acid diesters) certain are known from the literature (Chem. Ber., 95, 473, 1962) having $n=4$, 5 or 6, and $R^1$ and $R^2$ being methyl, ethyl, n-propyl, iso-propyl and n-butyl. Other derivatives of the same class of compounds can be prepared in the same way by reacting a dialkoxy-chlorophosphite with an alkylene-bis-(magnesium halide).

Derivatives having $n=1$ to 3 do not, however, seem to be preparable.

Because in the relevant literature a very great number of phosphorus compounds having at least one ROP— grouping is known, a specific enumeration of examples for the group $R^2$ is not necessary. The $R^3O$ group is so selected that it is capable of undergoing the Michaelis-Arbuzov reaction; therefore, the chloride formed of the group $R^3$ should be easily volatile in order to be quickly removable from the reaction mixture.

Lower alkyls and cycloalkyls having up to 6 carbon atoms comply with that requirement. Methyl and ethyl are generally preferred. The removal of higher boiling chlorides such as butyl chloride and cyclohexyl chloride can be accelerated by working under reduced pressure.

The chloromethylphosphonic acid diesters serving as reactants in the instant process also are well known from the literature. The possibilities of choice of the group $R^1$ are the same as for the group $R^2$.

The reaction is generally carried out without a solvent. Moisture and oxygen have to be excluded. The reaction is expediently conducted in an inert atmosphere, e.g., nitrogen.

The α,ω - bis - (O,O' - diorganophosphonylmethyl-O-organophosphinyl)-alkanes which are obtained according to the process and which have not been known previously are valuable chelating agents and therefore can be used for extracting metals or metal salts. Moreover, they are useful as plasticizers. The compounds can be converted to the corresponding acids by heating with concentrated hydrochloric acid. An especially advantageous method for the conversion to the corresponding acid comprises simply heating of the iso-propyl ester at about 180 to 200° C. The acids are soluble in water and can be added, for example, in the form of alkali salts to washing and cleaning agents. Thus, they can totally or partially replace complexing agents such as polyphosphates, nitrilotriacetates, ethylenediaminetetraacetate, hydroxyethylidenediphosphate, etc. usually occurring in detergent compositions.

EXAMPLE

A mixture consisting of 28.5 g. (0.092 mol) of pentamethylene-bis-(phosphonous acid diester) corresponding to the formula $(C_2H_5O)_2PCH_2CH_2CH_2CH_2CH_2P(OC_2H_5)_2$ and 34.1 g. (0.184 mol) of chloromethylphosphonic acid diethylester corresponding to the formula $$ClCH_2P(O)(OC_2H_5)_2$$

is stirred at 170° C. in a nitrogen atmosphere. After 5 hours there have been split off 10.1 g. (85.5%) of ethyl chloride. The volatile compounds are distilled off (8.6 g., b.p. 45–166° C./1.5 mm.) from the reaction mixture. There remain 43.9 g. (87.8%) of 1,5-bis-(O,O'-diethylphosphonylmethyl-O-ethylphosphinyl)-pentane; b.p. 220–230° C./0.001 mm.; $n_D^{20}$ 1.4598. A small amount of decomposition occurs during the distillation.

For the conversion to the corresponding acid, 5.66 g. (0.01 mol) of the product are refluxed with 40 ml. of concentrated hydrochloric acid and then the hydrochloric acid is completely evaporated. There are obtained 3.88 g. (100%) of the acid as a solid.

The acid can be titrated as a hexabasic acid; equivalent weight calc'd 68.6, found 64.7. According to the $^1$H and $^{31}$P NMR spectra, the acid shows the formula

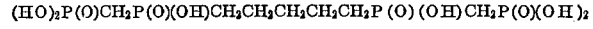

$^{31}$P chemical shift: $p_\alpha$ —17.1 p.p.m.; $p_\beta$ —48.9 p.p.m.; $\alpha:\beta=1:1$. $^1$H chemical shift (ref. TMS in capillary tube): a at 2.1δ (multiplet); b at 2.96δ (quartet) $J_{P_\alpha H}$ 20.5 Hz., $J_{P_\beta H}$ 17.5 Hz.); c at 5.51δ (singlet).

I claim:
1. α,ω-Bis-(O,O'-diorganophosphonylmethyl-O-organophosphinyl)-alkanes of the general formula

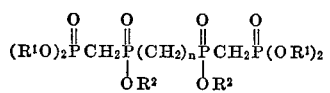

in which $R^1$ and $R^2$ signify identical or different alkyl groups having from 1 to 4 carbon atoms and $n$ is an integer of 4 to 6.

2. 1,5 - Bis - (O,O' - diethylphosphonylmethyl-O-ethylphosphinyl)-pentane.

References Cited
UNITED STATES PATENTS 3,171,818  3/1965  Sander _____ 260—932 X
3,256,370  6/1966  Fitch et al. _____ 260—932 X ANTON H. SUTTO, Primary Examiner U.S. Cl. X.R.

252—Dig. 17; 260—30.6 R, 502.4 P, 927 R, 969

UNITED STATES PATENT OFFICE
CERTIFICATE OF CORRECTION

PATENT NO. : 3,845,169
DATED : October 29, 1974
INVENTOR(S) : Ludwig Maier

It is certified that error appears in the above-identified patent and that said Letters Patent are hereby corrected as shown below:

On the cover sheet insert -- Foreign Application Priority Data
    Switzerland    13538/68    September 6, 1968 --

Col. 1, line 60, "+" should be -- ÷ --.

Col. 1, line 63, "+" should be -- ÷ --.

Col. 1, line 68, "1962" should be "1963".

Signed and Sealed this eleventh Day of November 1975

[SEAL]

Attest:

RUTH C. MASON
Attesting Officer

C. MARSHALL DANN
Commissioner of Patents and Trademarks